C. P. DOOLAN.
BEET HARVESTER.
APPLICATION FILED OCT. 3, 1918.
1,293,632.
Patented Feb. 4, 1919.
2 SHEETS—SHEET 1.
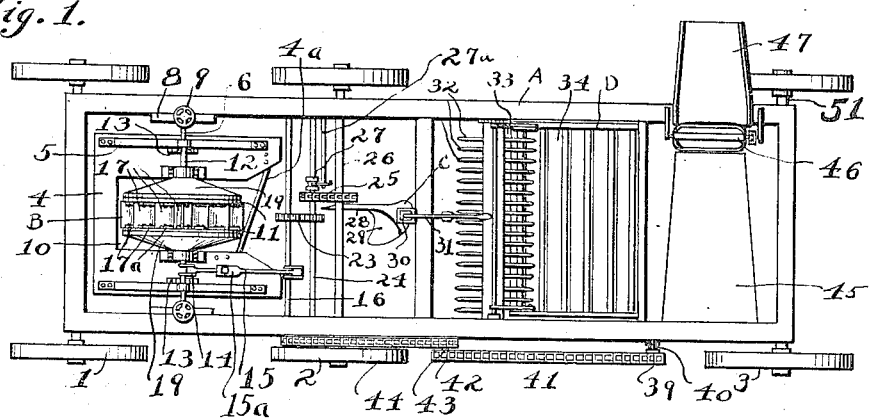
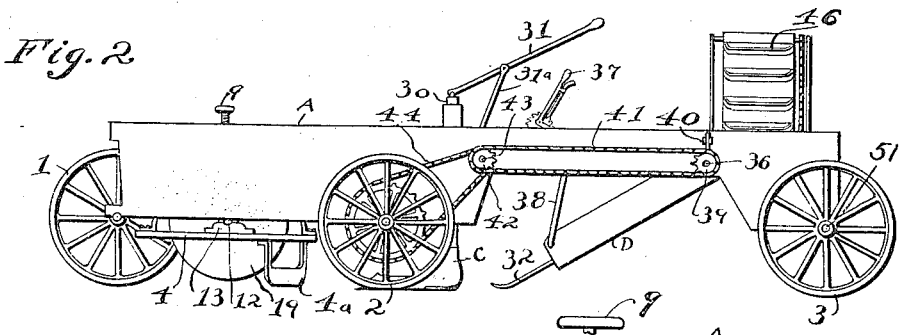
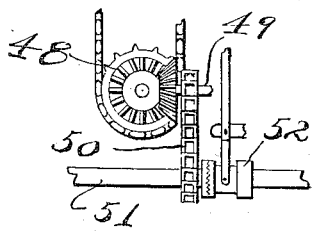
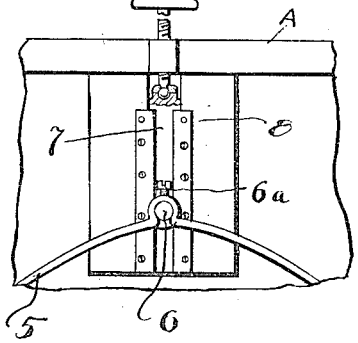
INVENTOR
CHAS. P. DOOLAN.
By H. S. Hee
ATTORNEY

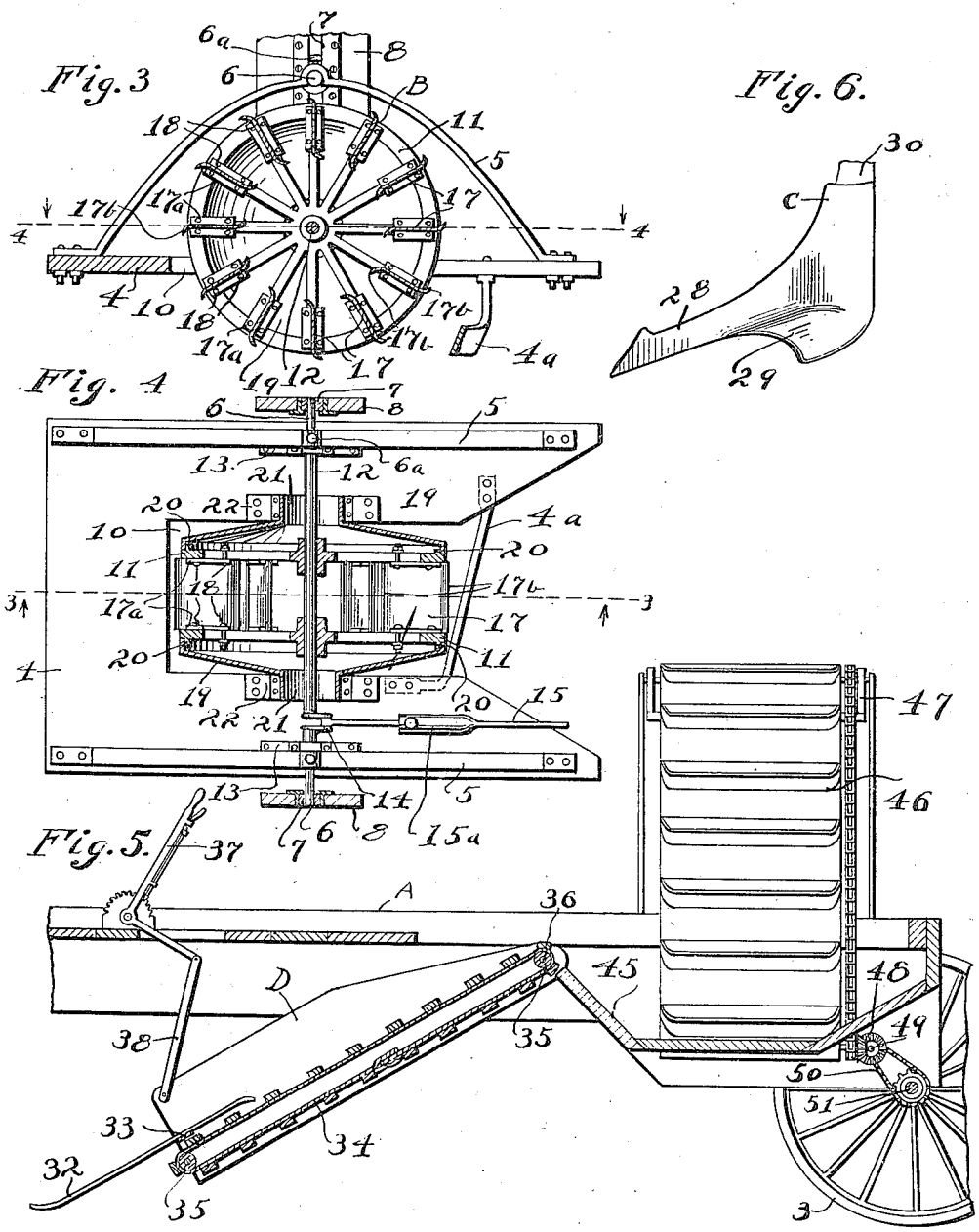

UNITED STATES PATENT OFFICE.

CHARLES PATRICK DOOLAN, OF GEBO, WYOMING, ASSIGNOR OF ONE-HALF TO ALBERT BOZEK, OF GEBO, WYOMING.

BEET-HARVESTER.

1,293,632.     Specification of Letters Patent.     Patented Feb. 4, 1919.

Application filed October 3, 1918. Serial No. 256,682.

*To all whom it may concern:*

Be it known that I, CHARLES PATRICK DOOLAN, a citizen of the United States, residing at Gebo, in the county of Hot Springs, State of Wyoming, have invented new and useful Beet-Harvesters; and I do hereby declare the following to be a full, clear, and exact description of the invention, such as will enable others skilled in the art to which it appertains to make and use the same.

The present invention relates to a beet harvesting machine, and has for its object to provide a device of this character which embodies novel features of construction whereby it will operate in an effective manner to cut the tops from a row of beets, loosen the soil and cut the roots of the beets, lift the beets out of the ground, and finally discharge them into a wagon or other suitable receptacle provided to receive them.

Further objects of the invention are to provide a beet harvester which will operate in an effective manner upon both large and small beets, which will harvest the beets in a quick and satisfactory manner with a minimum amount of labor, and which can be readily adjusted to operate in the most effective manner under different conditions.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a top plan view of a beet harvester constructed in accordance with the invention.

Fig. 2 is a side elevation thereof.

Fig. 3 is an enlarged sectional view through the cutting table and knife wheel.

Fig. 4 is a top plan view of the cutting table and knife wheel.

Fig. 5 is an enlarged longitudinal sectional view through the rear end of the machine.

Fig. 6 is an enlarged detail view of the digger.

Fig. 7 is a detail view of the gearing between the rear axle and the bucket elevator.

Fig. 8 is a detail view of the mounting at one side of the cutting table.

Corresponding and like parts are referred to in the following description and indicated in all the views of the drawings by the same reference characters.

Referring to the drawings, which illustrate one possible embodiment of the invention, the reference character A designates the main frame which is supported upon the three pairs of wheels 1, 2 and 3, respectively. This frame is intended to be propelled over a row of beets for the purpose of cutting the tops from the beets and harvesting the same, any suitable form of power or energy being adapted to be used for moving or propelling the machine. The forward end of the main frame A carries a swinging cutting table 4 which travels over the top of the row of beets as the machine is propelled. Opposite sides of the table 4 are provided with upright hangers 5 which pivotally engage trunnions 6 projecting from vertical slides 7 on side plates 8. The table can be swung about the trunnions into any desired angle and locked by set screws 6$^a$. Adjusting screws 9 are connected to the slide 7 and provide a means for moving the same up and down upon the rigidly mounted side plates to raise and lower the cutting table. The center of the cutting table is formed with an opening 10 within which the rotary cutter B operates. This cutter includes a pair of spaced wheels 11 which are rigid with a horizontal shaft 12, said shaft being journaled within bearings 13 provided on opposite sides of the table 4, and being formed with a crank portion 14 which is connected by a pitman 15 to a crank shaft 16 arranged at the rear of the cutting table and extending transversely across the main frame. The pitman 15 is preferably extensible, being shown as formed in sections which are adjustably connected at 15$^a$. The wheels 11 have the radially disposed knife blades 17 secured between the peripheral portions thereof, the flanged edges 17$^a$ of the knife blades being adjustably bolted at 18 to the spokes of the cutter wheels so that they are movable in and out upon the wheels and can be adjusted to operate in the most satisfactory manner under different conditions. The ends of the knife blades are deflected forwardly and sharpened at 17ᵇ to provide cutting edges which extend transversely of the cutter B and project from the periphery thereof so that they will operate upon the tops of the beets as the cutter is rotated. A bar 4ᵃ is arranged at the rear of the cutter B and serves to deflect the severed tops to one side. The two ends of each of the knife blades are provided with similar cutting edges 17ᵇ so that the blades are reversible and can be used with either of the cutting edges in operative position. A conical guard and guide plate 19 is arranged on each side of the cutter B, the flared ends of the guard plates loosely engaging peripheral ribs 20 on the respective cutter wheels 11, while the tapered ends of the conical guard plates terminate in tubular sleeves 21 which are secured by suitable clamps 22 to the knife table on opposite sides of the opening 10, and through which the cutter shaft 12 passes.

The crank shaft 16 to which the rear end of the pitman 15 is connected is driven by a gearing 23 from a countershaft 24 which has a chain and sprocket connection 25 with the axle 26 of the intermediate set of wheels 2 upon which the main frame is mounted. A clutch 27 mounted on a bracket arm 27ᵃ controls the chain and sprocket connection 25 and provides a means for throwing the rotary cutter B into and out of operation. When the machine is traveling over a row of beets, the cutting table 4 is lowered to bring the cutter B into position for severing the tops of the beets as the machine is advanced, the clutch 27 being then closed so that the cutter will be driven from the wheels 2. However, when the machine is being moved to and from the beet field and is not in operation, the cutting table 4 is raised to elevate the cutting knives above the surface of the ground, and the clutch 27 is opened so that the rotary cutter will not be driven.

Supported upon the main frame A at the rear of the cutters is a digger C, said digger being formed with a vertical blade 28 which cuts through the soil at one side of the row of beets, and also with a horizontal blade 29 which is arranged back of the vertical blade and cuts through the soil under the row of beets so as to sever the roots and admit of the beets being subsequently lifted out of the ground without difficulty. This digger C is mounted so that it can be moved up and down and lifted above the surface of the ground when the machine is not in operation. For this purpose the digger may be carried by a vertical plunger 30 which is operatively connected to a lever 31 pivoted on a bracket 31ᵃ so that it can be raised and lowered and locked in an adjusted position.

Following the digger C is a set of beet lifting tines 32 which are inclined downwardly and forwardly and are mounted upon the lower end of a carrier frame D. These tines have the forward ends thereof deflected forwardly and the upper ends thereof deflected rearwardly, said tines being secured at a point toward the upper ends thereof to a square cross bar 33 which extends transversely across the carrier frame D. These tines engage the beets which have been loosened by the digger C and carry them up to an endless carrier 34 which is mounted upon the carrier frame D. This endless carrier passes around the upper and lower guide rollers 35, the upper roller 35 being rigid with a shaft 36 upon which the carrier frame D is pivotally mounted, and which receives power from the intermediate set of supporting wheels 2. A lever 37 is connected by a link 38 to the lower end of the carrier frame D and enables the carrier frame and tines to be vertically adjusted and swung upwardly into inoperative position when the machine is not in use or is being moved toward or away from the beet field. The shaft 36 is provided at one end with a sprocket wheel 39 which can either be locked with the shaft or permitted to rotate freely thereon, being controlled by a clutch 40. A chain 41 connects this sprocket wheel 39 to a sprocket 42 on a shaft 43 which has a chain and sprocket connection 44 with one of the intermediate supporting wheels 2. Provision is thus made for driving the endless carrier 34 when the harvester is in operation.

From the upper end of the carrier 34 the beets are deposited in a hopper 45, and a bucket elevator 46 is provided for lifting the beets from this hopper and discharging them through a side chute 47 into a wagon or like conveyance following at one side of the harvester. The lower guide roller of the bucket elevator 46 is shown as having a bevel gear connection 48 with a countershaft 49 which has a chain and sprocket connection 50 with the axle 51 of the rear supporting wheels 3. A clutch 52 controls the chain and sprocket connection 50 and provides for throwing the bucket elevator into and out of operation.

In the operation of the beet harvester it will be understood that as the machine is advanced over a row of beets, the knife blades of the rotary cutter B will sever the tops from the beets while the latter are still in the ground, after which the digger C will cut the roots under the beets and loosen the ground so that the beets can be easily lifted out of the ground by the tines 32. These tines drop the beets on the carrier 34 which serves to discharge them into the hopper 45. From this hopper the beets are raised by the bucket elevator 46 and dropped in the chute 47 which serves to deliver them into a wagon or other conveyance provided for that purpose and traveling at one side of the harvesting machine.

Having thus described the invention, what I claim as new and desire to secure by Letters Patent, is:—

1. A beet harvester including a supporting frame, a table mounted on the frame and formed with a cut away portion, a shaft extending across the cut away portion, a pair of spaced wheel members carried by the shaft and projecting through the cut away portion, radially disposed knife blades connecting the spaced wheel members and having the outer edges thereof sharpened and deflected laterally, and means for driving the shaft.

2. A beet harvester including a supporting frame, a table mounted on the frame and formed with a cut away portion, a shaft extending across the cut away portion, a pair of spaced wheel members rigid with the shaft and extending through the cut away portion, radially disposed knife blades adjustably mounted between the peripheral portions of the wheel members, opposite edges of the knife blades being formed with laterally deflected cutting edges so that the knife blades are reversible, and means for driving the shaft.

3. A beet harvester including a supporting frame, a table mounted on the frame and having a cut away portion, a shaft extending across the cut away portion, a pair of spaced wheel members rigid with the shaft and extending through the cut away portion, radially disposed knife blades connecting the wheel members and terminating at their ends in flanges which are adjustably secured to the wheel members, the edges of the knife blades terminating in corresponding laterally deflected cutting edges so that the knife blades are reversible, and means for driving the shaft.

4. A beet harvester including a supporting frame, a table mounted on the frame and formed with a cut away portion, a shaft extending across the cut away portion, a pair of spaced wheel members rigid with the shaft and extending through the cut away portion, guide means carried by the table and engaging the outer faces of the wheel members, knife blades connecting the wheel members and formed with cutting edges, and means for driving the shaft.

5. A beet harvester including a supporting frame, a table mounted on the frame and formed with a cut away portion, a shaft extending across the cut away portion, a pair of spaced wheel members carried by the shaft and extending through the cut away portion, flared guide plates carried by the table and loosely engaging the peripheral portions of the wheel members, knife blades connecting the wheel members and formed with cutting edges, and means for driving the shaft.

6. A beet harvester including a supporting frame, a table mounted on the frame and formed with a cut away portion, a shaft extending across the cut away portion, a pair of spaced wheel members rigid with the shaft and extending through the cut away portion, annular ribs on the outer faces of the wheel members, flared guide plates carried by the table and having the edges thereof loosely engaging the ribs of the wheel members, knife blades connecting the wheel members and formed with cutting edges, and means for driving the shaft.

7. A beet harvester including a supporting frame, a table mounted on the frame and formed with a cut away portion, a shaft extending across the cut away portion, bearings projecting from the table and receiving the shaft, a pair of spaced wheel members rigid with the shaft, flared guide plates having the outer edges thereof loosely engaging the wheel members and formed at their tapered portions with tubular sleeves through which the shaft extends, clamping means engaging the sleeves, knife blades connecting the wheel members and formed with cutting edges, and means for driving the shaft.

In testimony whereof I have signed my name to this specification in the presence of two subscribing witnesses.

CHARLES PATRICK DOOLAN.

Witnesses:
 FRANK HOOVER,
 ANNIE DONOHUE.

Copies of this patent may be obtained for five cents each, by addressing the "Commissioner of Patents, Washington, D. C."